United States Patent
Grinshpun et al.

(10) Patent No.: US 9,549,342 B2
(45) Date of Patent: Jan. 17, 2017

(54) METHODS AND APPARATUSES FOR CONGESTION MANAGEMENT IN WIRELESS NETWORKS WITH MOBILE HTPP ADAPTIVE STREAMING

(71) Applicant: Alcatel Lucent USA, Inc., Murray Hill, NJ (US)

(72) Inventors: Edward Grinshpun, Murray Hill, NJ (US); David Faucher, Murray Hill, NJ (US); Sameerkumar V. Sharma, Murray Hill, NJ (US); Paul A. Wilford, Murray Hill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/430,383

(22) PCT Filed: Oct. 25, 2013

(86) PCT No.: PCT/US2013/066818
§ 371 (c)(1),
(2) Date: Mar. 23, 2015

(87) PCT Pub. No.: WO2014/070607
PCT Pub. Date: May 8, 2014

(65) Prior Publication Data
US 2015/0257035 A1    Sep. 10, 2015

Related U.S. Application Data (60) Provisional application No. 61/719,519, filed on Oct. 29, 2012.

(51) Int. Cl.
*H04W 28/02*    (2009.01)
*H04L 12/801*    (2013.01)
(Continued)

(52) U.S. Cl.
CPC ......... *H04W 28/0289* (2013.01); *H04L 47/32* (2013.01); *H04L 47/33* (2013.01);
(Continued)

(58) Field of Classification Search
CPC .................... H04W 28/0289; H04W 28/0205; H04W 28/0284; H04L 47/30; H04L 47/32; H04L 47/33; H04L 65/1083; H04L 65/4092; H04L 65/602
(Continued)

(56) References Cited

U.S. PATENT DOCUMENTS

2008/0298248 A1    12/2008  Roeck et al.
2012/0023253 A1    1/2012   Rhyu et al.
(Continued)

FOREIGN PATENT DOCUMENTS

EP    1926329 A1    5/2008
JP    2010-533419 A    10/2010

OTHER PUBLICATIONS (3GPP TS 26.247 version 11.3.0 Release 11) Universal Mobile Telecommunications System (UMTS); LTE; Transparent end-to-end Packet-switched Streaming Service (PSS); Progressive Download and Dynamic Adaptive Streaming over HTTP (3GP-DASH), Jul. 2013.
(Continued)

*Primary Examiner* — Afsar M Qureshi
(74) *Attorney, Agent, or Firm* — Harness, Dickey & Pierce, P.L.C.

(57) ABSTRACT

In a method for controlling congestion within a cell of a wireless network providing mobile HTTP adaptive streaming (HAS), a mobile HAS client in the cell delays a request for a next HAS segment of a HAS media stream for a delay time interval in response to a notification of congestion within the cell. The mobile HAS client calculates a reduced
(Continued)

bitrate for the next HAS segment, and requests the next HAS segment at the reduced bitrate after expiration of the delay time interval. The reduced bitrate is reduced relative to a bitrate for a previous HAS segment of the HAS media stream.

20 Claims, 5 Drawing Sheets

(51) Int. Cl.
   *H04L 12/823* (2013.01)
   *H04L 29/06* (2006.01)
   *H04L 12/835* (2013.01)

(52) U.S. Cl.
   CPC ........ *H04L 65/4092* (2013.01); *H04L 65/602* (2013.01); *H04W 28/0205* (2013.01); *H04W 28/0231* (2013.01); *H04W 28/0284* (2013.01); *H04L 47/30* (2013.01); *H04L 65/1083* (2013.01)

(58) Field of Classification Search
   USPC .................................. 370/231–235; 709/204
   See application file for complete search history.

(56) References Cited

U.S. PATENT DOCUMENTS

| | | | | |
|---|---|---|---|---|
| 2012/0051216 A1* | 3/2012 | Zhang | ...................... | H04L 47/12 370/230 |
| 2013/0138828 A1* | 5/2013 | Strasman | ............ | H04N 21/2385 709/231 |
| 2013/0159421 A1* | 6/2013 | Yue | ...................... | H04L 65/4084 709/204 |
| 2014/0204962 A1* | 7/2014 | Park | ................... | H04N 21/8547 370/509 |

OTHER PUBLICATIONS

3GPP TR 26.938 V0.3.0 (Aug. 2012), 3rd Generation Partnership Project; Technical Specification Group Services and System Aspects; Packet-Switched Streaming Service (PSS) Improved Support for Dynamic Adaptive Streaming over HTTP in 3GPP (Release 11).

3GPP TS 26.247 V11.0.0 (Sep. 2012), 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11).

Huawei Technologies Co., Ltd., Network Assistance Adaptation, TSG-SA4 #64 meeting Tdoc S4 (11)0407, Apr. 8, 2011, [Search Date: Apr. 19, 2016], URL, <http://www.3gpp.org/ftp/tsg_sa/WG4_CODEC/TSGS4_64/docs/S4-110407.zip>.

Liu, et al., "Rate Adaptation for Adaptive HTTP Streaming", Feb. 2011, pp. 169-174.

Liu, et al., "Signal Processing: Image Communication: Rate adaptation for dynamic adaptive streaming over HTTP in content distribution network", Apr. 1, 2012, V27 N4, pp. 288-311.

Huawei Technologies Co et al, "Network Assistance Adaptation", 3GPP Draft; S4-110510_Network-Assistance-Adaptation, 3rd Generation Partnership Project (3GPP), Mobile Competence Centre; 650, Route des Lucioles; F-06921 Sophia-Antipolis Cedex; France, Apr. 13, 2011 (Apr. 13, 2011).

C. Liu, "Rate adaptation for dynamic adaptive streaming over HTTP in content distribution network", Signal Processing: Image Communication, vol. 27, No. 4, Apr. 1, 2012 (Apr. 1, 2012), 24pgs.

T. Kupka,"An evaluation of live adaptive HTTP segment streaming request strategies", Local Computer Networks (LCN), 2011 IEEE 36th Conference on, IEEE, Oct. 4, 2011 (Oct. 4, 2011), 9 pgs.

International Search Report PCT/ISA/210 for International Application No. PCT/US2013/066818 dated Oct. 25, 2013.

* cited by examiner

METHODS AND APPARATUSES FOR CONGESTION MANAGEMENT IN WIRELESS NETWORKS WITH MOBILE HTPP ADAPTIVE STREAMING

CROSS-REFERENCE TO RELATED APPLICATIONS

This non-provisional patent application claims priority under 35 U.S.C. §119(e) to provisional U.S. application No. 61/719,519 filed on Oct. 29, 2012 in the United States Patent and Trademark Office, the entire contents of which are incorporated herein by reference.

BACKGROUND

Hyper-text-transfer-protocol (HTTP) adaptive streaming (HAS) is emerging as a popular approach to streaming video-on-demand and real-time content. With regard to video-on-demand, for example, HAS is adaptive in the sense that the video quality can be adjusted based on the bandwidth or data rate available between the HAS server and a respective HAS client. However, each HAS client individually adapts its video quality independent of other HAS clients sharing the same resources.

Mobile HAS is rapidly becoming the preferred technology for watching video-on-demand and real-time multimedia content on mobile devices. As the use of mobile HAS increases, handling congestion for mobile HAS related traffic has become increasingly important for wireless service providers. Similar to wireline HAS, mobile HAS is also adaptive in the sense that the video quality can be adjusted based on the bandwidth or data rate available between the HAS server and a respective mobile HAS client.

For the most part, mobile HAS currently utilizes wireless Best Effort (BE) data connections. However, this is problematic when a wireless access network becomes congested because the HAS adaptation cannot timely identify access network congestion conditions, and thus, the prohibitively high data load on the wireless network caused by mobile HAS traffic persists, which results in delays, packet loss, escalation of congestion conditions, etc. This is especially true for $3^{rd}$ Generation Partnership Project Long-Term Evolution (3GPP LTE) networks that allow individual clients to receive about 2-4 Mb/sec data streams, in which case about 8-10 mobile HAS clients can easily overload a serving eNode B or cell. Greedy non-cooperating client behavior where each mobile HAS client attempts to obtain maximal available cell throughput further contributes to the congestion problem, while adding unfairness in video quality distribution.

From the end user perspective, the congestion problem manifests itself in oscillating video quality with video freezes. From the wireless service provider's perspective, over-the-top HAS traffic is considered one of the main contributors to the network congestion itself.

SUMMARY

At least one example embodiment provides a method for controlling congestion within a cell of a wireless network providing mobile HTTP adaptive streaming (HAS). According to at least this example embodiment, the method includes: delaying, at a mobile HAS client in the cell, a request for a next HAS segment of a HAS media stream for a delay time interval in response to a notification of congestion within the cell; calculating, at the mobile HAS client, a reduced bitrate for the next HAS segment, the reduced bitrate being reduced relative to a bitrate for a previous HAS segment of the HAS media stream; and requesting, by the mobile HAS client, the next HAS segment at the reduced bitrate after expiration of the delay time interval.

At least one other example embodiment provides a mobile device for mobile HTTP adaptive streaming (HAS) in a wireless communications network. According to at least this example embodiment, the mobile device includes: a processor including a HAS client. The HAS client is configured to: delay a request for a next HAS segment of a HAS media stream for a delay time interval in response to a notification of congestion within a cell of the wireless communications network; calculate a reduced bitrate for the next HAS segment, the reduced bitrate being reduced relative to a bitrate for a previous HAS segment of the HAS media stream; and request the next HAS segment at the reduced bitrate after expiration of the delay time interval.

At least one other example embodiment provides a method for controlling congestion in a cell of a wireless network during an active HTTP adaptive streaming (HAS) session. According to at least this example embodiment, the method includes: detecting congestion within the cell; generating, by an access network element in response to the detected congestion, congestion control parameters for the active HAS session with a mobile HAS client; and notifying the mobile HAS client of the detected congestion by sending a congestion notification message to the mobile HAS client, the congestion notification message including the generated congestion control parameters.

At least one other example embodiment provides a non-transitory computer-readable storage medium storing computer executable instructions that, when executed on one or more computer devices, cause the one or more computer devices to execute a method for controlling congestion within a cell of a wireless network providing mobile HTTP adaptive streaming (HAS). According to at least this example embodiment, the method includes: delaying, at a mobile HAS client in the cell, a request for a next HAS segment of a HAS media stream for a delay time interval in response to a notification of congestion within the cell; calculating, at the mobile HAS client, a reduced bitrate for the next HAS segment, the reduced bitrate being reduced relative to a bitrate for a previous HAS segment of the HAS media stream; and requesting, by the mobile HAS client, the next HAS segment at the reduced bitrate after expiration of the delay time interval.

At least one other example embodiment provides a non-transitory computer-readable storage medium storing computer executable instructions that, when executed on one or more computer devices, cause the one or more computer devices to execute a method for controlling congestion in a cell of a wireless network during an active HTTP adaptive streaming (HAS) session. According to at least this example embodiment, the method includes: detecting congestion within the cell; generating, by an access network element in response to the detected congestion, congestion control parameters for the active HAS session with a mobile HAS client; and notifying the mobile HAS client of the detected congestion by sending a congestion notification message to the mobile HAS client, the congestion notification message including the generated congestion control parameters.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., radio network controllers base stations, base station controllers, Node Bs, eNode Bs, user equipments (UEs), serving gateways (SGWs), packet data network (PDN) gateways (PGWs), mobile management entities (MMEs), etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNode B" or "eNB" may be considered synonymous to, and may hereafter be occasionally referred to as a Node B, an evolved Node B, base station, base transceiver station (BTS), etc., and describes a transceiver in communication with and providing wireless resources to user equipments (UEs) in a wireless communication network spanning multiple technology generations. As discussed herein, base stations may have all functionally associated with conventional, well-known base stations in addition to the capability and functionality to perform the methods discussed herein. Moreover, as discussed herein, the term cell may refer to the sector coverage provided by the eNode B.

The term "user equipment," as discussed herein, may be considered synonymous to, and may hereafter be occasionally referred to, as a client, mobile unit, mobile station, mobile user, mobile, subscriber, user, remote station, access terminal, receiver, etc., and describes a remote user of wireless resources in a wireless communication network.

Mobile HAS clients are well-known clients as described, for example, in 3$^{rd}$ Generation Partnership Project (3GPP) TS 26.247 version 11.3.0 Release 11, which is titled "Universal Mobile Telecommunications System (UMTS); LTE; Transparent end-to-end Packet-switched Streaming Service (PSS); Progressive Download and Dynamic Adaptive Streaming over HTTP (3GP-DASH)" from July 2013. Because mobile HAS clients such as these are well-known, a detailed discussion is omitted.

Example embodiments will be described herein, for example purposes, with regard to a 3GPP Long-Term Evolution (3GPP LTE) Universal Terrestrial Radio Access Network (UTRAN). However, example embodiments may be utilized in conjunction with radio access networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); 4th Generation (4G) LTE; and LTE Advanced.

Although one or more example embodiments may be described with regard to video content, it should be understood that example embodiments are applicable to other types of multimedia content, such as audio.

Figure 1:
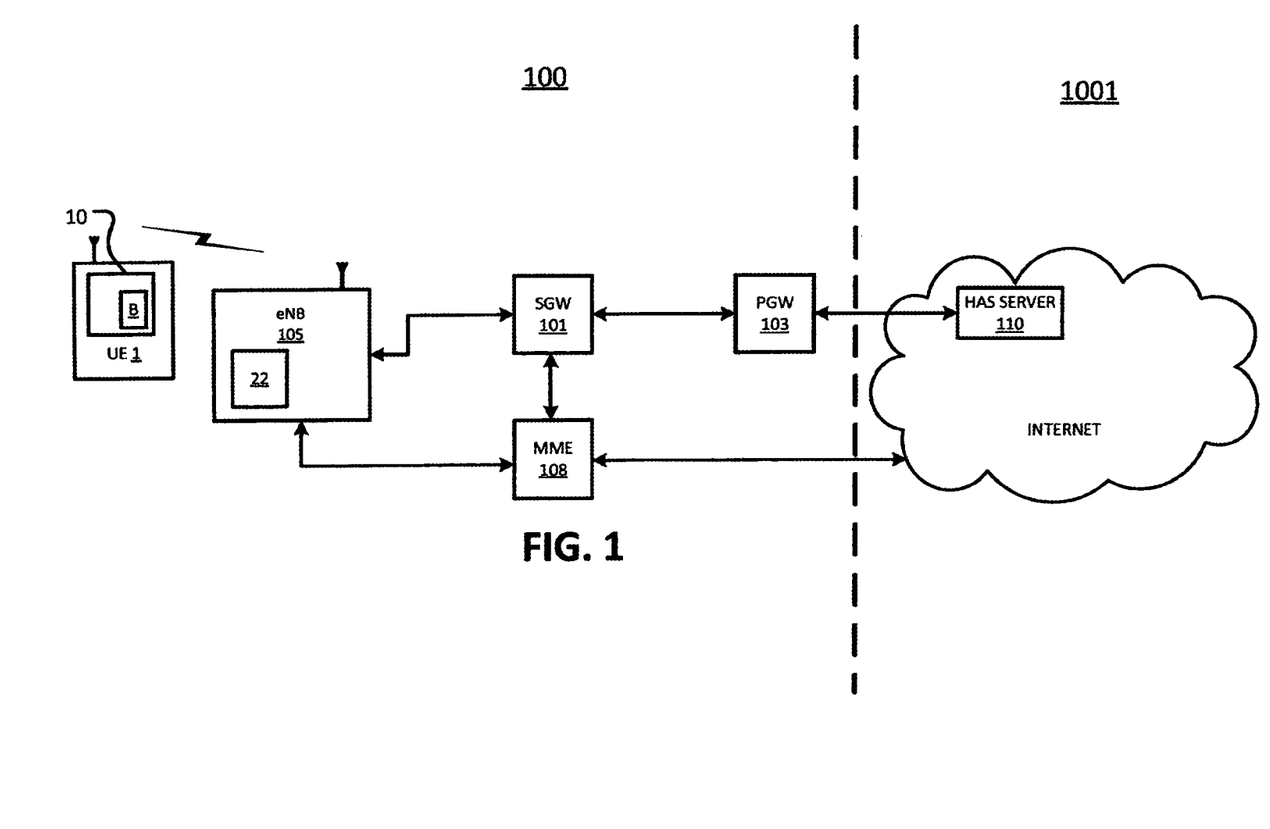
FIG. 1 illustrates a portion of a communications network.

FIG. 1 illustrates a portion of a communications network. The network includes a wireless communications network 100 and a backhaul network 1001.

Referring to FIG. 1, the wireless communications network 100 includes a serving gateway (SGW) 101, a packet data network (PDN) gateway (PGW) 103, a mobile management entity (MME) 108, and an eNode B (eNB) 105. The backhaul network 1001 may be an Internet Protocol network such as the Internet, and includes a hyper-text-transfer-protocol (HTTP) adaptive streaming (HAS) server 110.

The eNB 105 provides wireless resources and radio coverage for UEs including UE 1. The UE 1 includes a mobile HAS client 10, which further includes a play buffer B. Example functionality of the mobile HAS client 10 and the play buffer B will be discussed in more detail later with regard to FIGS. 2B and 3B. For the purpose of clarity, only one UE is illustrated in FIG. 1. However, any number of UEs may be connected to the eNB 105. In the example shown in FIG. 1, the UE 1 is attached to the eNB 105, and thus, the eNB 105 may be referred to as the serving eNB (or cell) 105.

Still referring to FIG. 1, the eNB 105 includes a congestion control function block 22. Although the congestion control function block 22 is shown in FIG. 1 as located at the eNB 105, example embodiments are not limited to this example. Rather, the congestion control function block 22 may be located at higher layers, such as the SGW 101, PGW 103, a dedicated server (not shown), the MME 108, etc. Example functionality of the congestion control function block 22 will be discussed in more detail later with regard to FIGS. 2A and 3A.

The eNB 105 is operatively connected to the SGW 101. Multiple eNBs may communicate with the SGW 101, however, only one is shown for clarity.

The SGW 101 routes and forwards user data packets from UEs connected to the eNB 105. Further, the SGW 101 provides access for the eNB 105 to the PGW 103.

The PGW 103 provides connectivity between the UE 1 and the HAS server 110 as well as external packet data networks, such as the Internet. As is known, the PGW 103 performs policy enforcement, packet filtering for UEs, charging support, lawful interception and packet screening. Because general functionality of SGWs and PGWs is well-known, a more detailed discussion is omitted.

Still referring to FIG. 1, the HAS server 110 is a web server that hosts multiple encodings of the same video content at different bitrate resolutions (also referred to as bitrates). As the bitrate resolution of the video content increases, the picture quality improves and more bandwidth is required to provide the content to the mobile HAS client 10.

The video content at each bitrate resolution is divided into smaller video segments (e.g., about 2-5 seconds in length) so that a HAS client 10 is able to switch (e.g., seamlessly switch) between bitrate resolutions by requesting a next or subsequent video segment (or segments) from the HAS server 110 at a different bitrate resolution than a previous video segment (or segments). In the context of a mobile HAS system, lower bitrates result in lower video quality and smaller segment size for the same play duration, which reduces the resulting load on the network.

In the example illustrated in FIG. 1, the wireless communications network 100 is illustrated as including an SGW and an eNB. However, according to example embodiments the wireless communications network 100 may include any type of radio access technology capable of supporting shared resource allocation across multiple users through scheduling. Examples include, but are not limited to, LTE and enhanced voice-data only (EVDO) radio access technology, high-speed downlink packet access (HSPDA), HSPDA+, wideband code division multiple access (WCDMA), worldwide interoperability for microwave access (WiMAX), etc.

Still referring to FIG. 1, the eNB 105 is also operatively connected to the MME 108. The MME 108 is the control-node for the wireless access-network, and is responsible for all the control plane functions related to subscriber and session management. From that perspective, the MME 108 supports security procedures, terminal-to-network session handling, and idle terminal location management. Because general functionality of MMEs is well-known, a more detailed discussion is omitted.

To stream video content during an active mobile HAS session, the mobile HAS client 10 begins by retrieving a special manifest file (as described, for example, in 3GPP TS 26.247 Version 11.3.0 Release 11) from the HAS server 110. The manifest file includes information about available bitrates for the video content, encodings, segments (e.g., identification, duration, etc.) and specifics on how to request the content. Because manifest files such as these are generally well-known, a more detailed discussion is omitted.

As mentioned above, the mobile HAS client 10 includes a play buffer B. In this example, the play buffer B is a fixed play buffer. The mobile HAS client 10 maintains the fixed play buffer B (e.g., ranging from about 30 seconds to about 5 minutes) in an effort to smooth the end-user experience. The mobile HAS client 10 uses a Rate Determination Algorithm (RDA) to select the bitrate for each video segment (or group of segments) requested from the HAS server 110. As is known, the mobile HAS client 10 may utilize some preset logic, heuristics and/or thresholds along with historic data for buffer fullness and estimated available throughput bandwidth for received segments to execute the RDA. At the application layer, mobile HAS client vendors customize RDAs (e.g., different video cache sizes, different thresholds, different rate selection choices, etc.) on a per mobile device type basis. As a result, mobile HAS clients on different products (e.g., smartphones, tablets, laptop computers, etc.) may exhibit different behavior under the same network conditions. These RDA variations/customizations utilize various kinds of heuristics in an attempt to identify the underlying network congestion at the mobile HAS client by applying slope and moving average based thresholds to the historic estimates of bandwidth throughput and play buffer fullness.

The HAS server 110 provides the mobile HAS client 10 with the requested video content at the requested bitrates in response to respective requests from the mobile HAS client 10. The mobile HAS client 10 then displays the received video content to the end-user.

As mentioned above, mobile HAS in conventional networks primarily utilizes wireless Best Effort (BE) data connection and application layer signaling between the mobile HAS client 10 and the HAS server 110 in an attempt to match the requested video bitrates with estimated bandwidth available to the mobile HAS client 10.

In order to provide for a more stable video quality and avoid ping-pong in bitrate selection, each mobile HAS client maintains RDA thresholds (e.g. associated with the level of buffer fullness) so that the drop in the selected bitrate for the next segment only occurs when a certain threshold is reached, and not due to intermittent packet loss or delay.

This necessary threshold mechanism introduces a great deal of inertia in the bitrate selection at the mobile HAS client, which can cause overloading of the wireless network due to HAS traffic to persist for some time (e.g., on the order of several tens of seconds to minutes) after the congestion begins. As a result of such overload, the serving cell may begin to drop packets causing TCP retransmissions, which further contribute to escalating overload conditions.

As is known, with prolonged congestion/overload conditions the effective throughput of the network can drop significantly below its capacity, and some mobile HAS clients may reach buffer empty states resulting in video freezes. For other mobile HAS clients, rate drops may overshoot those necessary causing subsequent video quality oscillation due to RDA adjustments until the process converges, which may require time on the order of tens of seconds to minutes. Meanwhile, changing network conditions may extend the convergence period, which may accentuate these issues.

As mentioned above, RDA variations/customizations at the mobile HAS clients utilize various kinds of heuristics in an attempt to identify underlying network congestion at the mobile HAS client. However, such heuristics cannot accurately identify the congestion since they lack the complete network view and are applied independently for each individual mobile HAS client. Moreover, mobile HAS clients do not receive any indication of congestion from the access network, leaving the HAS clients to identify congestion on their own.

Example embodiments provide methods, devices and computer readable storage mediums for faster congestion resolution for HAS traffic at the cell level and/or faster convergence of rate selection to a more stable level for individual HAS clients (e.g., on the order of seconds in some simulation results).

According to at least one example embodiment, a congestion control function module at a network element (e.g., eNB, PGW, SGW, MME, etc.) notifies a mobile HAS client of detected congestion within the serving cell. In response to the notification of the detected congestion, the HAS client enters a special congestion mode. In the special congestion mode operation, the mobile HAS client delays sending of a request for a next segment of content for a delay time interval, calculates a reduced bitrate for a next segment to be requested after the delay time interval, and requests the next segment at the reduced bitrate after expiration of the delay time interval. This methodology facilitates faster convergence to a more stable rate for all mobile HAS clients.

The duration of the delay time interval is set such that there is sufficient time for the cell congestion to be resolved, but still leaving video play buffer sufficiently full so as not to cause video interruption at the end-user. In one example, the duration of the delay time interval may be equal or substantially equal to the play duration of several segments of video content. The length of the delay time interval may also take into account the remaining processing/forwarding of the currently requested segment for the mobile HAS client. That is, for example, the duration of the delay time interval may be set such that there is sufficient time for the cell congestion to be resolved after completion of processing/forwarding of a currently requested segment for each mobile HAS client.

Figure 2A:
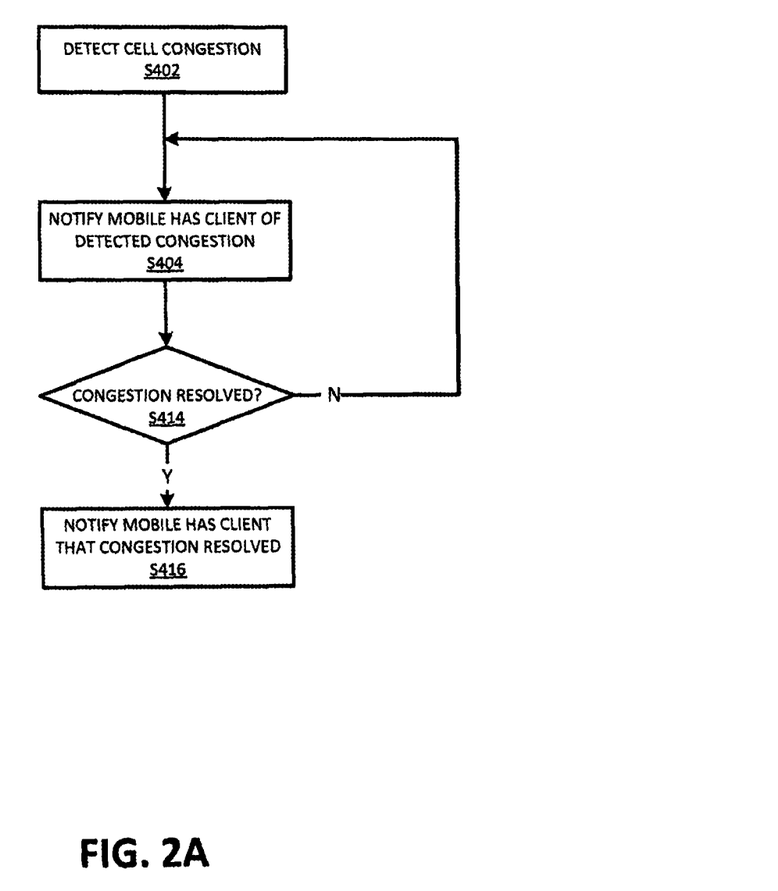
FIGS. 2A and 2B are flow charts illustrating an example embodiment of a method for congestion management in wireless networks with mobile Hyper-text-transfer-protocol (HTTP) adaptive streaming.
Figure 2B:
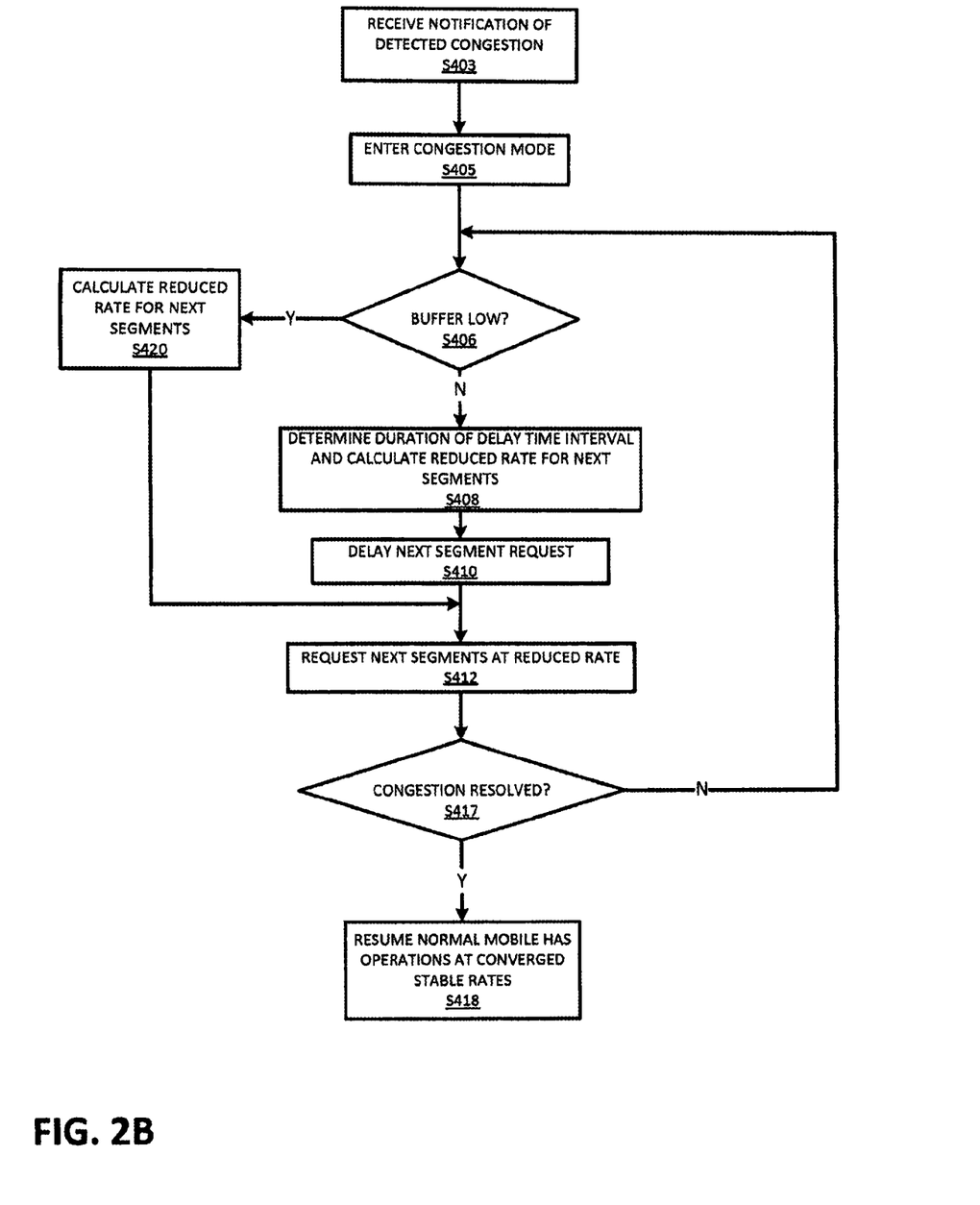

FIGS. 2A and 2B are flow charts illustrating a method for congestion resolution according to an example embodiment. The method shown in FIGS. 2A and 2B utilizes standards-based signaling via the Explicit Congestion Notification (ECN) in the Internet Protocol (IP) header of packets carrying HAS segments.

As is known, the ECN is an extension to the IP and TCP, and is defined in Internet Engineering Task Force (IETF) Request for Comments (RFC) 3168 (2001). ECN allows end-to-end notification of network congestion without dropping packets.

According to at least this example embodiment, the ECN may be added to the IP header of packets carrying HAS segments by the congestion control function block 22 at the eNB 105 before sending the IP packets with the HAS segments to the mobile HAS client 10. The flow chart in FIG. 2A illustrates example operations/functionality of the congestion control function block 22, whereas the flow chart in FIG. 2B illustrates example operations/functionality of the mobile HAS client 10.

For example purposes and simplicity in discussing example embodiments, congestion is assumed to be caused by mobile HAS clients selecting bitrate resolutions (also referred to as "bitrates") that are too high such that adjusting requested bitrates for subsequent HAS segments to more appropriate lower values is sufficient to resolve the congestion condition at the serving eNB. However, example embodiments are also applicable in situations where congestion is caused by a combination of HAS traffic and non-HAS traffic (e.g., web browsing, FTP, e-mail check, etc.). Moreover, the example embodiment shown in FIGS. 2A and 2B will be described with regard to a single HAS client for simplicity. However, it should be understood that the same or substantially the same methodology is applicable to a plurality of mobile HAS clients simultaneously or concurrently.

Referring to FIG. 2A, during an active mobile HAS session between the mobile HAS client 10 and the HAS server 110 utilizing the wireless resources provided by the serving eNB 105, at step S402 the congestion control function block 22 detects congestion (e.g., persistent congestion) at the serving eNB 105. The congestion control function block 22 and/or the eNB 105 may detect congestion at the serving eNB 105 in any well-known manner. Because methods for detecting cell congestion are well-known, a detailed discussion is omitted. In one example, the serving eNB 105 may detect congestion when the content of cell buffers exceed a threshold value, by comparing traffic toward the eNB 105 with the capacity of the cell, based on UEs reporting of selected rates that exceed cell capacity, etc. However, example embodiments should not be limited to these examples.

At step S404, the congestion control function block 22 notifies the mobile HAS client 10 of the detected congestion. In one example, the congestion control function block 22 signals the detected congestion to the mobile HAS client 10 via explicit congestion notification (ECN) by setting the CE (Congestion Experienced) codepoint flag in the IP header of packets carrying HAS segments from the HAS server 110 as per IETF RFC 3168. As discussed in more detail later with regard to FIG. 2B, the congestion notification from the congestion control function block 22 causes the mobile HAS client 10 to enter a special congestion mode, which facilitates resolution of the detected congestion at the serving eNB 105.

After notifying the mobile HAS client 10 of the detected congestion, and a wait period, the congestion control function block 22 determines whether the detected congestion has been resolved at step S414. In one example, the wait period may be about 2 to about 4 seconds. Alternatively, the wait period may be omitted and the congestion control function block 22 may immediately and/or continuously determine whether the detected congestion has been resolved at step S414. The congestion control function block 22 and/or the eNB 105 may determine whether the cell congestion has been resolved in any well-known manner. Because methods for detecting that congestion has been resolved are well-known, a detailed discussion is omitted. In one example, the eNB 105 may detect that congestion has been resolved when the content of cell buffers fall below a threshold value, by comparing traffic toward the eNB 105 with the capacity of the cell, based on UEs reporting of selected rates that exceed cell capacity, etc. However, example embodiments should not be limited to these examples If the congestion control function block 22 detects that the detected congestion at the serving eNB 105 has been resolved, then at step S416 the congestion control function block 22 notifies the mobile HAS client 10 that the congestion has been resolved. In at least one example embodiment, the congestion control function block 22 notifies the mobile HAS client 10 that the detected congestion has been resolved via the ECN by resetting (or clearing) the CE codepoint flag bit in (from) the IP headers of the packets carrying the next HAS segment to be sent to the mobile HAS client 10 after detecting that the congestion has been resolved.

Returning to step S414, if the congestion control function block 22 still detects congestion after the wait period, then the process returns to step S404 where the congestion control function block 22 continues to include the set CE codepoint flag in the IP header of packets carrying HAS segments sent to the mobile HAS client 10. The process then continues as discussed above until the congestion at the serving eNB 105 is resolved. In the example shown in FIG. 2A, the congestion control function block 22 continues to include the set ECN flag in IP packets carrying HAS segments until the congestion is resolved at the serving eNB 105.

Turning now to FIG. 2B, at step S403 the mobile HAS client 10 receives the notification of the detected congestion sent by the congestion control function block 22 at step S402 in FIG. 2A. In this example embodiment, the mobile HAS client 10 periodically checks received IP packets (carrying HAS segments) for the set CE codepoint flag bit (also referred to as the congestion indicator or congestion indicator bit). In one example, the mobile HAS client 10 may periodically check the received IP packets at intervals of about 2 to 6 seconds. Alternatively, the mobile HAS client 10 may check each received IP packet for the set CE codepoint flag bit.

At S405, the mobile HAS client 10 enters the above-mentioned special congestion mode in response to receiving the congestion notification (e.g., the set CE codepoint flag) from the congestion control function block 22.

In the special congestion mode, at step S406 the mobile HAS client 10 determines whether the play buffer B at the mobile HAS client 10 is low, depleted or near empty. In one example, the mobile HAS client 10 determines whether the play buffer B is depleted by comparing the current content level of the play buffer B with a threshold value. The threshold value may be a play duration of about 4 seconds.

If the mobile HAS client 10 determines that the play buffer B is not depleted at step S406, then the mobile HAS client 10 determines a duration of a delay time interval during which to delay or stop requests for subsequent video segments from the HAS server 110 at step S408.

In at least this example embodiment, the length of the delay time interval may be determined based on an average play duration of video segments at the mobile HAS client 10. For example, the length of the delay time interval may be equal or substantially equal to the average play duration of at least 2 video segments. In another example, the length of the delay time interval may be based on the content level of the play buffer B at the mobile HAS client 10 when the congestion notification is received at the mobile HAS client 10. For example, the mobile HAS client 10 may set the duration of the delay time interval to a length required for the play buffer B to reach certain buffer content (or fullness) threshold that causes RDA to naturally reduce the bitrate. In a more specific example, the duration of the delay time interval may be about 4 seconds. In yet another example, the length of the delay time interval may be the lesser of the duration of at least 2 video segments and about 4 seconds.

Also at step S408, the mobile HAS client 10 calculates a reduced bitrate for subsequent video segments after expiration of the delay time interval. According to example embodiments, the bitrates for subsequent video segments may be reduced by 1 or more levels (e.g., 2 levels) and/or exponentially (e.g., by about 50%).

At step S410, the mobile HAS client 10 delays requests for subsequent video segment requests from the HAS server 110 for the duration of the delay time interval determined at step S408.

At step S412, after expiration of the delay time interval, the mobile HAS client 10 requests the next video segment at the reduced rate calculated at step S408. According to at least one example embodiment, the mobile HAS client 10 requests the subsequent video segments at reduced bitrates, without waiting for conventional RDA thresholds to be reached.

At step S417, the mobile HAS client 10 determines whether the cell congestion has been resolved. According to at least this example embodiment, the mobile HAS client 10 determines whether the cell congestion has been resolved based on the congestion indicator from the congestion control function block 22. In at least one example, if the mobile HAS client 10 determines that the IP header of a most recently received packet from the congestion control function block 22 does not include a set CE codepoint flag bit, then the mobile HAS client 10 determines that the cell congestion has been resolved. On the other hand, if the IP header of a most recently received packet from the congestion control function block 22 still includes the set CE codepoint flag bit, then the mobile HAS client 10 determines that the cell congestion has not been resolved.

If the mobile HAS client 10 determines that the congestion has been resolved at step S417, then the mobile HAS client 10 exits the special congestion mode and continues the active mobile HAS session at a converged stable bitrate at step S418. In one example, the mobile HAS client 10 resumes normal RDA-driven calculations of rates for subsequent video segments.

Returning to step S417, if the mobile HAS client 10 determines that the cell congestion has not been resolved, then the process returns to step S406 and continues as discussed above. By returning to step S406, the mobile HAS client 10 is able to re-evaluate whether further bitrate reduction and/or delays of subsequent segment requests is/are necessary to facilitate resolution of the cell congestion.

Returning to step S406, if the mobile HAS client 10 determines that the play buffer B is low or depleted, then at step S420 the mobile HAS client 10 calculates a reduced rate for the next video segments and requests the next segments at the calculated reduced rate without or with only nominal delay. In this case, the duration of the delay time interval may be nominal (e.g., less than or equal to about 100 ms).

In one example, the mobile HAS client 10 requests the next video segments at the minimum bitrate available for the active mobile HAS session. The mobile HAS client 10 may calculate the reduced rate at step S420 in the same manner as discussed above with regard to step S408. The process then proceeds to step S412 and continues as discussed above.

The example embodiment discussed above with regard to FIGS. 2A and 2B facilitates resolution of the congestion caused by HAS traffic relatively quickly (e.g., in a matter of seconds in the simulation models) because traffic from the HAS server 110 is paused when HAS clients are not requesting subsequent video segments. The congestion resolution time may be determined by the time it takes to deliver already requested segments. Note that receiving the set CE codepoint flag may also cause TCP window reduction (as discussed in IETF RFC 3168), which may also facilitate congestion resolution.

To further aid congestion resolution, in the congestion mode the mobile HAS client 10 may close TCP sockets that are used to download the mobile HAS video segments, thus causing TCP stacks to abort download of currently requested segments.

According to at least some example embodiments, several rate adjustments may be needed for the mobile HAS client 10 to arrive at a converged stable rate. Accordingly, several iterations of the operations shown in FIG. 2A and/or 2B may be performed.

Figure 3A:
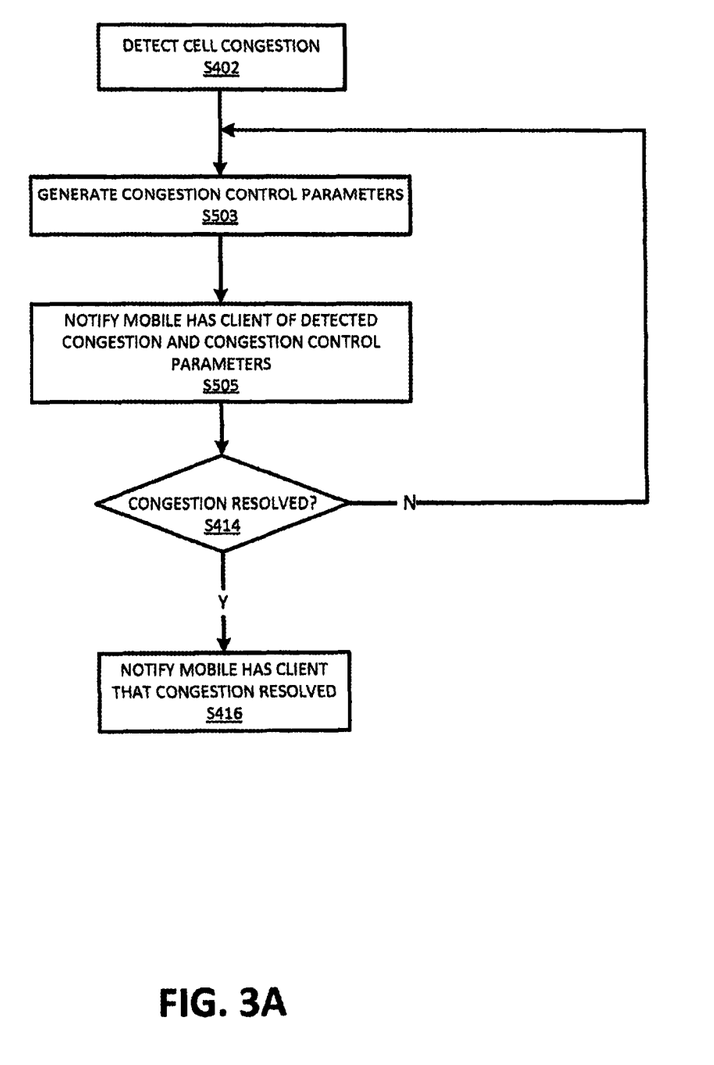
FIGS. 3A and 3B are flow charts illustrating another example embodiment of a method for congestion management in wireless networks providing mobile HAS adaptive streaming.
Figure 3B:
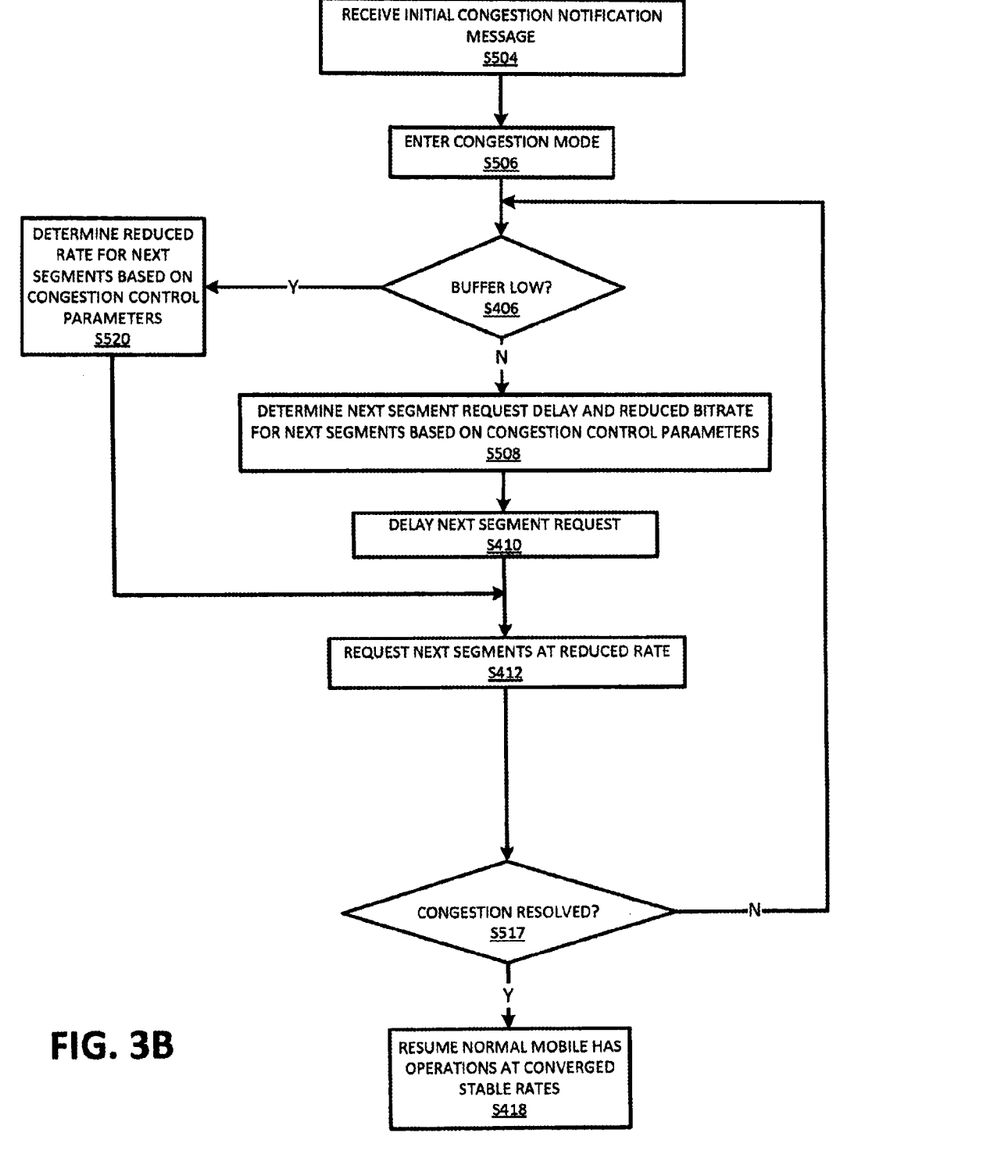

FIGS. 3A and 3B are flow charts illustrating a method for congestion resolution according to another example embodiment. The method shown in FIGS. 3A and 3B utilizes a different type of signaling of congestion within the serving cell than the method shown in FIGS. 2A and 2B, which utilizes the ECN field in the IP header. As with FIGS. 2A and 2B, the flow chart in FIG. 3A illustrates example operations/functionality of the congestion control function block 22, whereas the flow chart in FIG. 3B illustrates example operations/functionality of the mobile HAS client 10.

The congestion control function block 22 utilizes a message-based signaling in the form of a congestion notification message to communicate with the mobile HAS client 10. This message-based signaling allows the congestion control function block 22 to communicate congestion control parameters to the mobile HAS client 10 to facilitate resolution of the detected cell congestion. In one example, the congestion notification message includes the congestion control parameters. The congestion control parameters may include delay interval parameter and/or a bitrate reduction parameter. The delay interval parameter may be a recommended length or duration for the delay time interval. The bitrate reduction parameter may be a measure of bitrate reduction for subsequent video segment requests after expiration of the delay time interval. Examples of the bitrate reduction parameter may include, but are not limited to, maximum allowed bitrate for requesting subsequent HAS segments, maximum allowed consumed bandwidth (throughput), number of available bitrate levels to drop from the current level.

The recommended length for the delay time interval and the measure of bitrate reduction may be calculated explicitly (on a per mobile HAS client or an aggregate basis). In one example, the congestion control function block 22 may calculate the recommended duration of the delay time interval such that the detected congestion is resolved in a single iteration of the method. The congestion control function block 22 may calculate the recommended maximum bitrate to allow for faster convergence of requested bitrate to the stable value. In one example, the delay and rate reduction may be calculated based upon the severity of congestion condition, for example, based on how much the traffic being pushed over the air exceeds the cell capacity.

Referring to FIG. 3A, during an active mobile HAS session between the mobile HAS client 10 and the HAS server 110 utilizing the wireless resources provided by the serving eNB 105, at step S402 the congestion control function block 22 detects congestion (e.g., persistent congestion) at the serving eNB 105 in the same manner as discussed above with regard to FIG. 2A.

After detecting the congestion at the serving eNB 105, at step S503 the congestion control function block 22 generates the congestion control parameters for the mobile HAS client 10. As mentioned above, the congestion control parameters may include a delay interval parameter and/or a bitrate reduction parameter.

At step S505, the congestion control function block 22 notifies the mobile HAS client 10 of the detected congestion and the generated congestion control parameters by sending a congestion notification message to the mobile HAS client 10. In one example, the congestion notification message may be a dedicated message or corresponding field additions to the existing IP, Media Access Control (MAC) or HAS application layer messages. As discussed in more detail below with regard to FIG. 3B, the congestion notification from the congestion control function block 22 causes the mobile HAS client 10 to enter a special congestion mode, which facilitates resolving of the detected congestion at the serving eNB 105.

After notifying the mobile HAS client 10 of the detected congestion, and a wait period, the congestion control function block 22 determines whether the detected congestion has been resolved at step S414 in the same manner as discussed above with regard to FIG. 2A.

If the congestion control function block 22 determines that the congestion in the serving cell has been resolved, then at step S416 the congestion control function block 22 notifies the mobile HAS client 10 that the congestion has been resolved. In at least one example embodiment, the congestion control function block 22 notifies the mobile HAS client 10 using the dedicated message or corresponding field additions to the existing IP, MAC or HAS application layer messages mentioned above.

Returning to step S414, if the congestion control function block 22 still detects congestion after the wait period, then the process returns to step S503 and continues as discussed above until the cell congestion is resolved.

Referring now to FIG. 3B, at step S504 the mobile HAS client 10 receives the notification of the detected congestion and the congestion control parameters in an initial congestion notification message from the congestion control function block 22 at step S505 in FIG. 3A.

At step S506, the mobile HAS client 10 enters the special congestion mode in response to receiving the congestion notification message from the congestion control function block 22.

In the special congestion mode, at step S406 the mobile HAS client 10 determines whether the play buffer B is low, depleted or near empty in the same manner as described above with regard to FIG. 2B.

If the mobile HAS client 10 determines that the play buffer B is not low at step S406, then at step S508 the mobile HAS client 10 determines a duration of the delay time interval during which to delay requests for subsequent HAS segments from the HAS server 110 based on the delay interval parameter included in the congestion notification message. In one example, the delay interval parameter may be indicative of a recommended duration of the delay time interval. In this example, the mobile HAS client 10 sets the duration of the delay time interval to the recommended duration of the delay time interval received from the congestion control function block 22.

Also at step S508, the mobile HAS client 10 calculates the reduced bitrate for subsequent HAS segments based on the bitrate reduction parameter from the congestion control function block 22. In one example, the bitrate reduction parameter may be indicative of a maximum allowed bitrate for requesting subsequent HAS segments. In this example, the mobile HAS client 10 may set the reduced bitrate to be less than or equal to the maximum allowed bitrate.

At step S410, as discussed above with regard to FIG. 2B, the mobile HAS client 10 delays sending of subsequent video segment requests to the HAS server 110 for the duration of the delay time interval.

At step S412, in the same manner as discussed above with regard to FIG. 2B, after expiration of the delay time interval, the mobile HAS client 10 requests a next HAS segment at the reduced bitrate calculated at step S508. As with the example embodiment shown in FIGS. 2A and 2B, the mobile HAS client 10 requests the subsequent HAS segments at the reduced bitrate without waiting for conventional RDA thresholds to be reached.

In at least this example embodiment, the mobile HAS client 10 remains in the special congestion mode and continues to request subsequent HAS segments at the reduced rate until receiving a congestion notification message from the congestion control function block 22 indicating that the detected congestion has been resolved.

Returning to FIG. 3B, while in the special congestion mode, absence of notification indicates that congestion (and resolution parameters) remains. Unless congestion state or parameters change, the absence of a notification that congestion is cleared is sufficient to indicate that the mobile HAS client 10 should remain in the special congestion state. Accordingly, the mobile HAS client 10 receives congestion notification messages when congestion state changes or congestion resolution parameters calculated by the network change. In alternative example embodiments, however, the congestion notification messages may be periodic.

If the mobile HAS client 10 receives notification that congestion is cleared, then the mobile HAS client 10 determines that the detected congestion has been resolved at step S517. Then, at step S418, the mobile HAS client 10 exits the special congestion mode and continues the active mobile HAS session at a converged stable rate in the same manner as discussed above with regard to FIG. 2B.

Returning to step S517, if the mobile HAS client 10 determines that the detected congestion is not resolved, then the process returns to step S406 and continues as discussed above. In this case, as mentioned above, the absence of notification indicates that congestion (and resolution parameters) remains, which triggers a subsequent iteration of the method (e.g., steps S406, S412, S517 and if necessary, S520, S508, and S410) shown in FIG. 3B in an effort to further facilitate resolution of the cell congestion.

Returning to step S406, if the mobile HAS client 10 determines that the play buffer B is low or depleted, then at step S520 the mobile HAS client 10 calculates a reduced rate for the next video segments and requests the next segments at the calculated reduced rate without or with only nominal delay. In this case, the duration of the delay time interval may be nominal (e.g., less than or equal to about 100 ms). In one example, the mobile HAS client 10 requests the next video segments at the minimum bitrate available for the active mobile HAS session. The mobile HAS client 10 may calculate the reduced rate at step S520 in the same manner as discussed above with regard to step S508. The process then proceeds to step S412 and continues as discussed above.

According to at least some example embodiments, the congestion control function block 22 may request that the mobile HAS client 10 close TCP sockets and immediately abort downloading of current video segments (e.g., when a requested download is not yet complete).

Methods according to one or more example embodiments discussed herein may be embodied as computer-executable instructions stored on a computer readable medium. When executed on one or more computer devices, the one or more computer devices may execute the one or more methods discussed herein.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for controlling congestion within a cell of a wireless network providing mobile HTTP adaptive streaming (HAS), the method comprising:
    delaying, at a mobile HAS client in the cell, a request for a next HAS segment of a HAS media stream for a delay time interval in response to a notification of congestion within the cell, the mobile HAS client including a processor;
    calculating, at the mobile HAS client including the processor, a reduced bitrate for the next HAS segment, the reduced bitrate being reduced relative to a bitrate for a previous HAS segment of the HAS media stream; and
    requesting, by the mobile HAS client including the processor, the next HAS segment at the reduced bitrate after expiration of the delay time interval.

2. The method of claim 1, further comprising:
    setting a duration of the delay time interval based on a content level of a HAS buffer at the mobile HAS client.

3. The method of claim 2, wherein
    when the content level of the HAS buffer is greater than a buffer content threshold value, the setting step sets the duration of the delay time interval equal to a lesser of (i) a play duration of about 2 HAS segments and (ii) about 4 seconds; and the 2 HAS segments are video segments.

4. The method of claim 1, further comprising:
    receiving the notification of the congestion within the cell in a packet carrying a least a portion of the previous HAS segment.

5. The method of claim 4, wherein the notification of the congestion within the cell is an explicit congestion notification indicator.

6. The method of claim 1, further comprising:
    receiving a congestion notification message including the notification of the congestion within the cell, the congestion notification message further including congestion control parameter for the mobile HAS client; and wherein
    the calculating step calculates the reduced bitrate for the next HAS segment based on the received congestion control parameters.

7. The method of claim 6, wherein the congestion control parameters include a bitrate reduction parameter indicative of the reduced bitrate for the next HAS segment, and wherein
    the calculating step calculates the reduced bitrate for the next HAS segment based on the bitrate reduction parameter.

8. The method of claim 1, further comprising:
    receiving a congestion notification message including the notification of the congestion within the cell, the congestion notification message further including congestion control parameters for the mobile HAS client; and
    setting duration of the delay time interval based on the congestion control parameters.

9. The method of claim 8, wherein the congestion control parameters include a delay interval parameter indicative of a recommended duration for the delay time interval, and wherein
    the setting step sets the duration of the delay time interval based on the delay interval parameter.

10. A mobile device for mobile HTTP adaptive streaming (HAS) in a wireless communications network, the device comprising:
    a processor including a HAS client configured to,
        delay a request for a next HAS segment of a HAS media stream for a delay time interval in response to a notification of congestion within a cell of the wireless communication network,
        calculate a reduced bitrate for the next HAS segment, the reduced bitrate being reduced relative to a bitrate for a previous HAS segment of the HAS media stream, and
        request the next HAS segment at the reduced bitrate after expiration of the delay time interval.

11. The mobile device of claim 10, further comprising:
    a play buffer; and wherein
    the HAS client is further configured to set a duration of the delay time interval based on a content level of a play buffer.

12. The mobile device of claim 11, wherein
    when the content level of the play buffer is greater than a buffer content threshold value, the HAS client is configured to set the duration of the delay time interval to a lesser of (i) a play duration of about 2 HAS segments and (ii) about 4 seconds; and
    the 2 HAS segments are video segments.

13. The mobile device of claim 10, wherein the HAS client is further configured to receive the notification of the congestion within the cell in a packet carrying at least apportion of the previous HAS segment.

14. The mobile device of claim 13, wherein the notification of the congestion within the cell is an explicit congestion notification indicator.

15. The mobile device of claim 10, wherein the HAS client is further configured to,
    receive a congestion notification message including the notification of the congestion within the cell, the congestion notification message further including congestion control parameters for the HAS client, and
    calculate the reduced bitrate for the next HAS segment based on the congestion control parameters.

16. The mobile device of claim 15, wherein the congestion control parameters include a bitrate reduction parameter indicative of the reduced bitrate for the next HAS segment, and wherein the HAS client is further configured to calculate the reduced bitrate for the next HAS segment based on the bitrate reduction parameter.

17. The mobile device of claim 10, wherein the HAS client is further configured to,
  receive a congestion notification message including the notification of the congestion within the cell, the congestion notification message further including congestion control parameters for the HAS client, and
  set a duration of the delay time interval based on the congestion control parameters.

18. The mobile device of claim 17, wherein the congestion control parameters include a delay interval parameter indicative of a recommended duration for the delay time interval, and wherein the HAS client is further configured to set the duration of the delay time interval based on the delay interval parameters.

19. A method for controlling congestion in a cell of a wireless network during an active HTTP adaptive streaming (HAS) session, the method comprising:
  detecting congestion within the cell;
  generating, by an access network element in response to the detected congestion, congestion control parameters for the active HAS session with a mobile HAS client; and
  notifying the mobile HAS client of the detected congestion by sending a congestion notification message to the mobile HAS client, the congestion notification message including the generated congestion control parameters; wherein
    the congestion control parameters include a delay interval parameter indicative of a recommended duration for delaying subsequent HAS segment requests by the mobile HAS client during the active HAS session.

20. The method of claim 19, wherein
  the congestion control parameters further include a bitrate reduction parameter, and
  the bitrate reduction parameter is indicative of a reduced bitrate for subsequent HAS segments provided to the mobile HAS client during the active HAS session.

* * * * *

UNITED STATES PATENT AND TRADEMARK OFFICE
CERTIFICATE OF CORRECTION

| | |
|---|---|
| PATENT NO. | : 9,549,342 B2 |
| APPLICATION NO. | : 14/430383 |
| DATED | : January 17, 2017 |
| INVENTOR(S) | : Edward Grinshpun et al. |

Page 1 of 1

It is certified that error appears in the above-identified patent and that said Letters Patent is hereby corrected as shown below:

(54) Should read:
METHODS AND APPARATUSES FOR CONGESTION MANAGEMENT IN WIRELESS NETWORKS WITH MOBILE HTTP ADAPTIVE STREAMING Signed and Sealed this
Tenth Day of April, 2018

Andrei Iancu
*Director of the United States Patent and Trademark Office*